US012783289B2

(12) United States Patent

Kan et al.

(10) Patent No.: US 12,783,289 B2
(45) Date of Patent: Nov. 3, 2026

(54) METHOD FOR ACCELERATED COMPUTATION OF DATA AND RELATED APPARATUS

(71) Applicant: SUZHOU METABRAIN INTELLIGENT TECHNOLOGY CO., LTD., Suzhou (CN)

(72) Inventors: Hongwei Kan, Suzhou (CN); Junkai Liu, Suzhou (CN); Yanwei Wang, Suzhou (CN); Jiaheng Fan, Suzhou (CN); Rengang Li, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 416 days.

(21) Appl. No.: 18/566,640

(22) PCT Filed: May 26, 2022

(86) PCT No.: PCT/CN2022/095364
§ 371 (c)(1),
(2) Date: Dec. 2, 2023

(87) PCT Pub. No.: WO2023/123849
PCT Pub. Date: Jul. 6, 2023

(65) Prior Publication Data

US 2024/0370293 A1 Nov. 7, 2024

(30) Foreign Application Priority Data

Dec. 28, 2021 (CN) ........................ 202111615918.3

(51) Int. Cl.
*G06F 9/48* (2006.01)
*G06F 13/28* (2006.01)
*G06F 15/78* (2006.01)

(52) U.S. Cl.
CPC ............ *G06F 9/4843* (2013.01); *G06F 13/28* (2013.01); *G06F 15/7867* (2013.01)

(58) Field of Classification Search
CPC .................................................... G06F 9/4843
(Continued)

(56) References Cited

U.S. PATENT DOCUMENTS 10,776,144 B2 9/2020 Chandran et al.
2017/0300362 A1 10/2017 Liu et al.
(Continued)

FOREIGN PATENT DOCUMENTS

CN 105830053 A 8/2016
CN 109308280 A 2/2019
(Continued)

*Primary Examiner* — Charlie Sun
(74) *Attorney, Agent, or Firm* — IPro, PLLC

(57) ABSTRACT

Disclosed is a method for accelerated computation of data. The method includes: acquiring, by an accelerating device, computation acceleration control information from a memory of a host, and the computation acceleration control information includes input parameter address information and computation configuration information; acquiring, based on the input parameter address information, parameters to be computed from the memory of the host; and controlling, based on the computation configuration information, a computation unit to perform a computation operation on the parameters to be computed, and obtaining a computation result.

18 Claims, 4 Drawing Sheets

(58) Field of Classification Search
USPC .............................................................. 718/1
See application file for complete search history.

(56) References Cited

U.S. PATENT DOCUMENTS

| | | | | |
|---|---|---|---|---|
| 2021/0357267 | A1* | 11/2021 | Beale | G06F 9/355 |
| 2023/0168919 | A1* | 6/2023 | Zhu | G06F 9/5027 712/220 |
| 2023/0195664 | A1* | 6/2023 | Keely | G06F 13/1668 710/308 |

FOREIGN PATENT DOCUMENTS

| | | | |
|---|---|---|---|
| CN | 110334801 | A | 10/2019 |
| CN | 111143272 | A | 5/2020 |
| CN | 113094296 | A | 7/2021 |
| CN | 113238869 | A | 8/2021 |
| CN | 113419845 | A | 9/2021 |
| CN | 114003392 | A | 2/2022 |

* cited by examiner

METHOD FOR ACCELERATED COMPUTATION OF DATA AND RELATED APPARATUS

CROSS-REFERENCE TO RELATED APPLICATION

The present application claims priority to Chinese patent application No. 202111615918.3 entitled "METHOD AND APPARATUS FOR ACCELERATED COMPUTATION OF DATA", filed on Dec. 28, 2021 before the China National Intellectual Property Administration, which is incorporated herein in its entirety by reference.

TECHNICAL FIELD

The present application relates to the technical field of data processing, particularly relates to a method for accelerated computation of data, an apparatus for accelerated computation of data, an acceleration device, a server and a computer-readable storage medium.

BACKGROUND

With the continuous development of information technology, an acceleration framework represented by an open computing language (OpenCL) gets more and more attention. Further, more and more data centers begin to use a field programmable gate array (FPGA) for acceleration. In large-scale data centers, FPGA calculation cards are deployed on a large scale, providing a powerful calculating power for various acceleration applications and a sufficient flexibility.

SUMMARY

The present disclosure provides a method for accelerated computation of data, including:

acquiring, by an accelerating device, computation acceleration control information from a memory of a host, and the computation acceleration control information includes input parameter address information and computation configuration information;

acquiring, based on the input parameter address information, parameters to be computed from the host memory; and controlling, based on the computation configuration information, a computation unit to perform a computation operation on the parameters to be computed, and obtaining a computation result.

In one of the embodiments, the acquiring, by the accelerating device, the computation acceleration control information from the memory of the host includes:

acquiring, by the accelerating device, a context descriptor address from a memory of the accelerating device, and the context descriptor address is address data written by a computation initiator;

reading a context descriptor from the memory of the host based on the context descriptor address;

reading, based on a parameter storage address in the context descriptor, the input parameter address information from the memory of the host; and acquiring the computation configuration information from the context descriptor.

In one of the embodiments, the reading the context descriptor from the memory of the host based on the context descriptor address includes:

reading, by a direct data access mode, the context descriptor from the context descriptor address of the memory of the host; and acquiring, based on the input parameter address information, the parameters to be computed from the memory of the host includes:

writing, by the direct data access mode and input parameter address, the parameters to be computed from the memory of the host into the memory of the accelerating device.

In one of the embodiments, the direct data access mode is one of direct memory access (DMA), DMA chaining and remote direct memory access (RDMA).

In one of the embodiments, the context descriptor includes:

a number of the computation unit, a storage address of a running state of the computation unit and the input parameter address information.

In one of the embodiments, the input parameter address information includes:

a start storage address of the parameters to be computed in the memory of the host, a start storage address where the parameters to be computed are stored in the accelerating device and parameter length information.

In one of the embodiments, the context descriptor further includes: output parameter address information; and after the computation result is obtained, the method further includes:

writing, based on the output parameter address information, the computation result into the memory or the accelerating device, so that the host obtains the computation result from the memory or the accelerating device.

In one of the embodiments, the output parameter address information includes:

a start storage address where the computation result is stored in the memory of the host, a start storage address where the computation result is stored in the accelerating device and a result information length.

In one of the embodiments, the method further includes:

sending an interrupt signal to the host when the writing of the computation result completes.

The present disclosure further provides an apparatus for accelerated computation of data, including:

a control information acquisition module, configured to: acquire computation acceleration control information from a memory of a host, and the computation acceleration control information includes input parameter address information, output parameter address information and computation configuration information;

a computation parameter acquisition module, configured to acquire, based on the input parameter address information, parameters to be computed from the memory of the host; and a parameter computation module, configured to control, based on the computation configuration information, a core computation unit to perform a computation operation on the parameters to be computed, and obtain a computation result.

The present disclosure further provides an accelerating device, including: a memory and one or more processors. The memory stores computer-readable instructions that, when executed by the one or more processors, cause the one or more processors to implement the steps of the method for accelerated computation of data according to any one of the embodiments stated above.

The present disclosure further provides a server including the accelerating device and a memory connected to each other.

The present disclosure further provides one or more non-volatile computer-readable storage mediums storing computer-readable instructions that, when executed by one or more processors, cause the one or more processors to implement the steps of the method for accelerated computation of data according to any one of the embodiments stated above.

The details of one or more embodiments of the present disclosure are illustrated in the following drawings and description. Other features and advantages of the present disclosure will be apparent from the description, the drawings and the claims.

BRIEF DESCRIPTION OF THE DRAWINGS

In order to more clearly explain the technical solution in the embodiment of the present application or in the related art, the accompanying drawings which are used in the description of the embodiments or the related art may be briefly introduced below. Apparently, the drawings in the description below are merely some embodiments of the present disclosure, other drawings may be obtained, based on the provided drawings, by a person skilled in the art without involving any creative effort.

DETAILED DESCRIPTION

Figure 1:
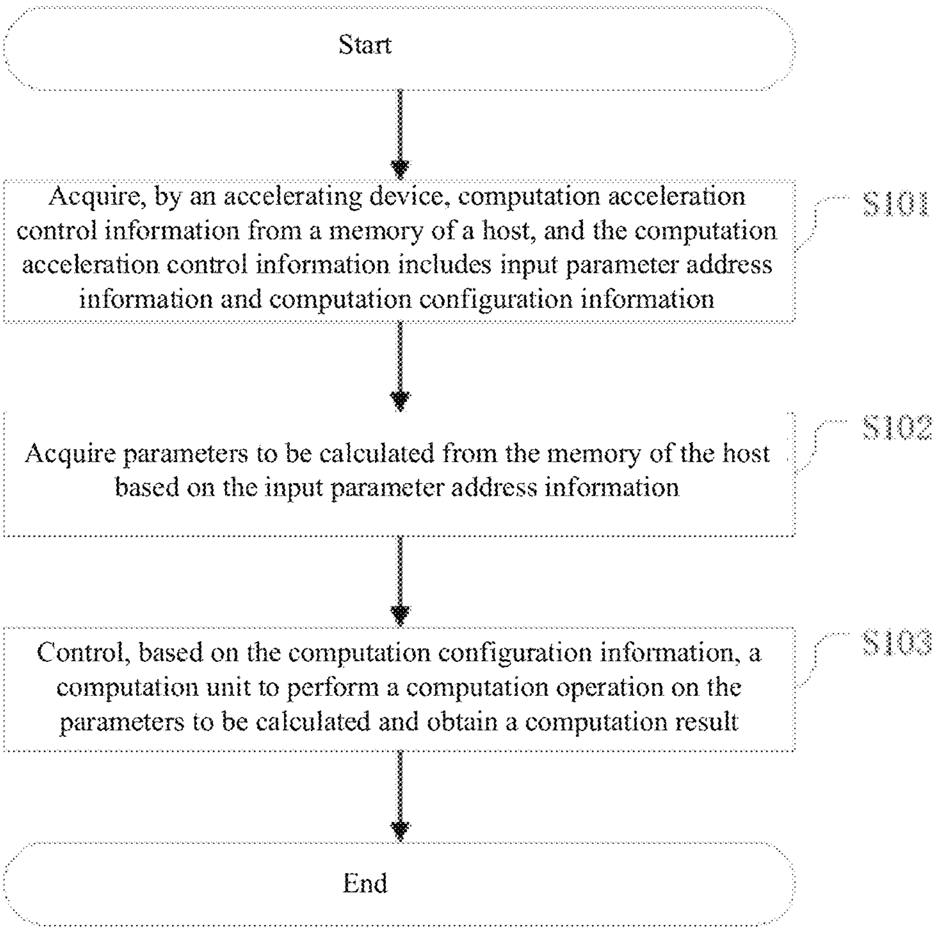
FIG. 1 is a flow chart of a method for accelerated computation of data according to one or more embodiments of the present disclosure.

The core of the present disclosure is to provide a method for accelerated computation of data, an apparatus for accelerated computation of data, an accelerating device, a server and a computer-readable storage medium to improve the efficiency of data computation that utilizes an accelerating device and improve the calculation performance.

In order to make the objects, the technical solutions and the advantages of the embodiments of the present disclosure clearer, the technical solutions in the embodiments of the present disclosure may be clearly and completely described below in combination with the drawings in the embodiments of the present disclosure. Apparently, the described embodiments are merely certain embodiments of the present disclosure, rather than all of the embodiments. Any other embodiment obtained by a person skilled in the art on the basis of the embodiments of the present disclosure without paying creative work falls within the protection scope of the present disclosure.

In the related art, a central processing unit (CPU) software layer of an acceleration platform first initiates a request for accelerated computation for an OpenCL task, that is, through a peripheral component interconnect express (PCIE) interface, a data writing request of parameters of 1-N is initiated. Depending on address alignment and a data volume of each written parameter, the host writes to the memory space of the FPGA accelerator by means of register writing and direct memory access (DMA) request, respectively. The host side issues a command for initiating a kernel operation, and the FPGA acceleration platform begins to compute. After the computation is completed, the FPGA acceleration platform writes parameters into a specified FPGA memory space, and then sends an interrupt notification signal to the host. The host side reads a computation result from a specific address of the FPGA accelerator, and the current accelerated computation at the host side ends. However, the inventor realizes that multiple operations of register reading/writing and DMA may occur at the host side, resulting in a great quantity of reading and writing responses, and the efficiency is low. In addition, a device handle of the FPGA accelerator is occupied, which brings pressure to the multithreading scheduling of the host.

Therefore, how to improve the efficiency of the acceleration device in accelerated computation and improve the calculation performance is a key problem concerned by a person skilled in the art.

In view of the above, the present disclosure provides a method for accelerated computation of data, in which the accelerating device actively acquires acceleration control information from the memory of the host, and then based on the acceleration control information, the accelerating device actively acquires data required by a corresponding accelerated computation from the host, and automatically performs the accelerated computation operation. Therefore, the host side is not necessary to actively send data to the accelerating device continuously for accelerated computation, thereby improving the efficiency of the host side and reducing the pressure on the performance of the host side.

Hereinafter, an embodiment is used to illustrate the method for accelerated computation of data provided by the present disclosure.

Referring to FIG. 1, FIG. 1 is a flow chart of a method for accelerated computation of data according to an embodiment of the present disclosure.

As an example, in the present embodiment, the method is applied to a server, and may include steps described below.

At S101, computation acceleration control information is acquired from a memory of the host by an accelerating device, and the computation acceleration control information includes input parameter address information and computation configuration information.

This step aims at obtaining, by the accelerating device, the computation acceleration control information from the memory of the host.

In the related art, the accelerating device generally receives the data and computation operation parameters sent from the host, that is, the accelerating device passively receives the data to accelerate the computation, which increases the operation process of the host for the accelerating device, increases the pressure on the performance of the host and reduces the efficiency. Therefore, in the present embodiment, in order to reduce the pressure of the host, instead of passively receiving the operation information sent by the host, the accelerating device actively acquires the computation acceleration control information from the memory of the host, so that the accelerating device actively performs data acceleration operation according to the computation acceleration control information.

The computation acceleration control information is information data for managing and controlling the process of the accelerating device. The computation acceleration control information includes the input parameter address information and the computation configuration information. The input parameter address information is used to determine an address of an input parameter in the host, and the corresponding input parameter may be actively acquired based on the address, rather than passively receiving the data sent by the host. The computation configuration information is information for configuring the computation process.

This step may further include the following steps:

step 1, acquiring, by the accelerating device, a context descriptor address from a memory of the accelerating device, the context descriptor address being address data written by a computation initiator;

step 2, reading a context descriptor from the memory of the host based on the context descriptor address;

step 3, reading, based on a parameter storage address in the context descriptor, the input parameter address information from the memory of the host; and step 4, acquiring the computation configuration information from the context descriptor.

As can be seen that, this optional solution is mainly used to illustrate how to obtain the computation configuration information. In this optional solution, the accelerating device acquires the context descriptor address from the memory of the accelerating device, and the context descriptor address is the address data written by the computation initiator; the context descriptor is read from the memory of the host based on the context descriptor address; the input parameter address information is read from the host memory based on the parameter storage address in the context descriptor; and the computation configuration information is acquired from the context descriptor.

Step 2 in the above optional solution may further include:

reading, by a direct data access mode, the context descriptor from the context descriptor address of the memory of the host.

As can be seen, this optional solution is mainly used to illustrate that the corresponding data is read by the direct data access mode, thereby improving the efficiency of data acquisition and avoiding the pressure on the host performance.

Further, a next step of "acquiring, based on the input parameter address information, parameters to be computed from the memory of the host" may include:

writing, by the direct data access mode and the input parameter address, the parameters to be computed from the memory of the host into the memory of the accelerating device.

As can be seen, this optional solution is mainly used to illustrate that the corresponding data is read by the direct data access mode, thereby improving the efficiency of data acquisition and avoiding the pressure on the host performance.

The direct data access mode refers to one of direct memory access (DMA), DMA chaining and remote direct memory access (RDMA).

As can be seen, the direct memory access mode used in this optional solution may include one of DMA, DMA chaining and RDMA.

At S102, parameters to be computed are acquired from the memory of the host based on the input parameter address information.

Based on S101, this step aims at acquiring the parameters to be computed from the memory of the host based on the input parameter address information.

As can be seen, this step mainly refers to that the parameters to be computed are directly acquired, based on addresses recorded in the input parameter address information, from the memory of the host without involving the CPU of the host, thereby reducing the pressure on the performance of the host side and improving the efficiency.

At S103, a computation unit is controlled, based on the computation configuration information, to perform a computation operation on the parameters to be computed, and a computation result is obtained.

Based on S102, this step aims at that the computation unit is controlled, based on the computation configuration information, to perform the computation operation on the parameters to be computed, and the computation result is obtained. That is, the corresponding computation unit is controlled based on the computation configuration information, and a corresponding computation operation is performed. Any computation approaches provided in the related art may be used for performing the computation operation, which is not limited here.

The context descriptor may include: the number of the computation unit, a storage address of a running state of the computation unit and the input parameter address information.

As can be seen, this optional solution is mainly used to illustrate the context descriptor. The context descriptor includes: the number of the computation unit, the storage address of the running state of the computation unit and the input parameter address information. The number of the computation unit records the number of a core unit implementing the computation operation, the storage address of the running state of the computation unit is a storage address of a computing state. The input parameter address information refers to address information about a position where the input parameter is located.

The input parameter address information may include: a start storage address of the parameters to be computed in the memory of the host, a start storage address where the parameters to be computed are stored in the accelerating device and length information about the parameter.

The context descriptor may further include output parameter address information. That is, the context descriptor may further include the output parameter address information that is used to indicate where the computation result is stored in the memory of the host.

The output parameter address information includes: a start storage address where the computation result is stored in the memory of the host, a start storage address where the computation result is stored in the accelerating device and a result information length.

Accordingly, based on the output parameter address information, after the computation result is obtained, the method may further include:

writing, based on the output parameter address information, the computation result into the memory or the accelerating device, so that a host acquires the computation result from the memory or the accelerating device.

In other words, the computation result is written into the memory or the accelerating device based on the output parameter address information, so that the host acquires the computation result from the memory or the accelerating device. That is, the computation result is directly output to the corresponding memory, so that the host may directly acquire the data.

Further, the present embodiment may further include:

sending an interrupt signal to the host when the writing of the computation result completes.

As can be seen, this optional solution is mainly used to illustrate how to indicate the completion of data writing. After the writing of the computation result completes, the interrupt signal is sent to the host.

In a word, in the present embodiment, the accelerating device actively acquires the acceleration control information from the memory of the host, and then based on the acceleration control information, the accelerating device actively acquires the corresponding data required for the acceleration from the host, and automatically performs the accelerated computation operation, instead of actively sending data, by the host side continuously, to the accelerating device for accelerated computation. Therefore, the efficiency of the host side is improved and the pressure on the performance of the host side is reduced.

The method for accelerated computation of data provided by the present disclosure is further illustrated by using a specific embodiment below.

Figure 2:
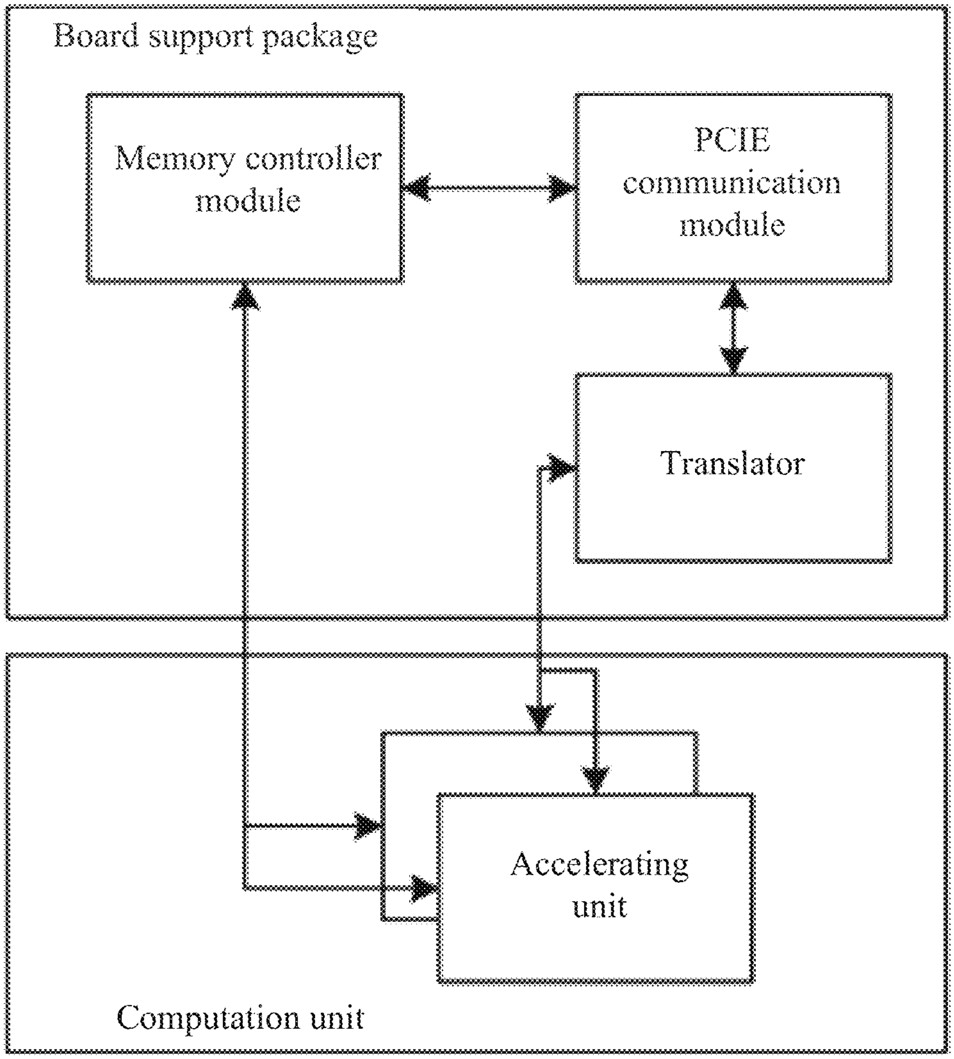
FIG. 2 is a schematic structural diagram of a method for accelerated computation of data according to one or more embodiments of the present disclosure.

Referring to FIG. 2, FIG. 2 is a schematic structural diagram of a method for accelerated computation of data according to the embodiment of the present disclosure.

In the present embodiment, a computation method and a computation device for decoupling data flow and control flow of an OpenCL streaming programming framework and unloading relevant processes to a FPGA engine are provided. By the collaboration of the CPU software drivers and the FPGA accelerating units (kernel), the computing tasks of the OpenCL Kernel are achieved with the lower latency and the greater computational throughput, without altering the standard OpenCL program.

In the present embodiment, the internal structure of the FPGA is shown in FIG. 2. A translator is added in the board support package (BSP) inside the traditional OpenCL streaming computation FPGA. The translator is located between the PCIE and the accelerator functional unit (AFU) (computation unit) module. The translator includes registers, and has the following functions: 1. issuing a DMA descriptor to PCIE according to the configuration, transferring data between the memory of the host and the memory of the FPGA; 2. according to the kernel context descriptor, automatically invoking the kernel to start to compute; 3. sending the computation result to the memory of the host based on the interrupt signal indicating that the computation in the kernel is completed and the kernel context descriptor.

The OpenCL execution process is as follows: before the computation starts, the host CPU writes computation parameters that need to be transferred to the kernel to the memory of the host, and stores an "input parameter list" in the host memory, where the "input parameter list" is a structural body formed by the start storage address of the computation parameters in the memory of the host, the start storage address in the memory of the FPGA, to which the computation parameters will be transmitted, and the parameter length information. If the computation parameters are not continuously stored in the memory of the host and there are a plurality of start storage addresses, the "input parameter list" is stored in the form of a linked list, that is, the end of each "input parameter list" includes the next start storage address of the parameter until the next "input parameter list" is empty. The host CPU stores an "output parameter list" in the memory of the host, and the "output parameter list" is a structural body formed by the start storage address of the computation result parameter in the memory of the host, the start storage address of the computation result parameter in the memory of the FPGA and the result information length. The host CPU stores the followings in the memory of the host: the number of the kernel that will implement the computation, the storage address of the "input parameter list", the storage address of the "output parameter list" and the storage address of the "kernel running state", all of which form a data structure of a "kernel context descriptor".

When the computing starts, the host CPU sends the storage address of the "kernel context descriptor" to the translator inside the FPGA through the PCIE writing register. The translator issues the DMA descriptor and reads the kernel context descriptor from the memory of the host to a register inside the FPGA. The translator is configured to: issue a DMA descriptor according to the address of the "input parameter list" in the kernel context descriptor, and obtain the "input parameter list" from the memory of the host; issue a DMA descriptor according to the "output parameter list" in the kernel context descriptor, obtain the "output parameter list" from the memory of host and store the "output parameter list" in the block ram inside the FPGA. According to the "input parameter list", the parameters used by the kernel during the computation are downloaded to the memory of the FPGA. After all of the parameters are downloaded, according to the number of the kernel in the kernel context, an instruction of invoking the kernel is issued through the original PCIE bus interface of the kernel, and the computing starts.

After the computation of the kernel completes, the translator writes the computation result data in an external memory of the FPGA to a corresponding address of the host according to the interrupt signal sent by the kernel and the "output parameter list" in the block ram. According to the storage address of the "kernel running state", information such as whether the computation of the kernel is successful is transmitted to the memory of the host. After all data transmission is completed, the translator sends an interrupt signal to the host through the PCIE, and the host CPU reads the computation result and the computation running state in the memory of the host.

Figure 3:
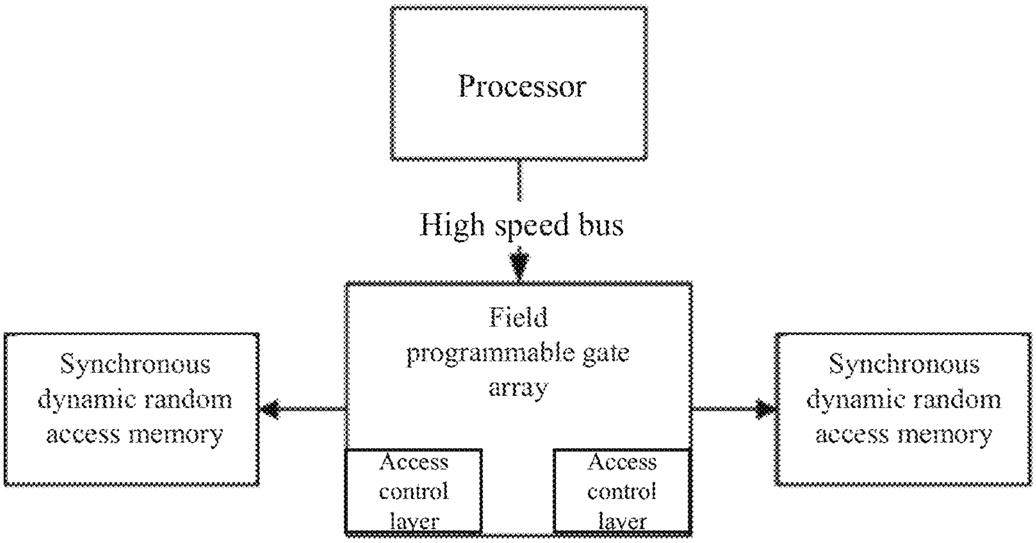
FIG. 3 is a schematic structural diagram of an accelerator card of a method for accelerated computation of data according to one or more embodiments of the present disclosure.

Referring to FIG. 3, FIG. 3 is a schematic structural diagram of an accelerator card of a method for accelerated computation of data according to an embodiment of the present disclosure.

The FPGA accelerator card used in a specific example of the present embodiment is the f10a accelerator card of the Inspur Group Ltd. As shown in FIG. 3, the FPGA of the accelerator card is the arria10 device of the Intel Corp. The FPGA is connected to two 10G Ethernet optical ports, has two 4 GB synchronous dynamic random access memories (SDRAMs) as the memories, and may be connected to the CPU of the server through the PCIE (peripheral component interconnect express).

A computation process for realizing the vector addition of 1 MB data is taken as an example. The specific algorithm is as follows: for 1 MB data in the memory of the host, a fixed value is added to each byte data through the kernel0 of the FPGA, and 1 MB result data is generated and returned to the memory of the host.

The host CPU is configured to: generate the "input parameter list" by using a starting storage address of the 1 MB raw data to be computed in the host, a starting storage address of the 1 MB raw data to be computed in the memory of the FPGA and the data length (1M bytes) of the 1 MB raw data to be computed; and generate the "output parameter list" by using a starting storage address of the result data in the host, a starting storage address of the result data in the memory of the FPGA and the data length (1M bytes) of the result data. The "kernel context descriptor" is composed of kernel number 0, the storage address of the "input parameter list", the storage address of the "output parameter list" and storage address of the "kernel running state".

When the computing starts, the host CPU writes the storage address of the "kernel context descriptor" to the register inside the translator of the FPGA. The translator reads the "kernel context descriptor" by the DMA mode; reads, according to the storage address of the "input parameter list", the "input parameter list" from the memory of the host by the DMA mode; writes, according to the "input parameter list", 1 MB raw data into a corresponding address space of the memory of the FPGA by the DMA mode; reads, according to the storage address of the "output parameter list", the "output parameter list" into the block ram inside the FPGA by the DMA mode; writes, according to the kernel number 0, the internal register of kernel0 via the original PCIE port of the AFU, so that kernel0 begins to compute.

The function of the kernel remains the same as the kernel function of the traditional OpenCL development. The raw data in the external memory of the FPGA is read by Kernel0 sequentially. After a specific operation (in the present embodiment, it is a vector addition operation) is performed, the result is stored in the result storage address space of the external memory of the FPGA. After the computation is completed, an interrupt signal is issued.

After receiving the interrupt signal, the translator performs the following: storing, according to the "output parameter list" in the block ram, the result data in the memory of the FPGA into the memory of the host by the DMA mode; according to the storage address of the "kernel running state", storing the computation success information into the memory of the host; sending an interrupt signal to the host CPU via the PCIE. After receiving the interrupt signal, the host CPU obtains the computation result and the computation success information from the memory of the host, and the computation is completed.

As can be seen, in the present embodiment, the scheduling initiation process that is originally implemented by the CPU software is partially unloaded into the FPGA engine and completed in coordination, without changing the OpenCL computing architecture design. The process during which CPU reads and writes the FPGA via the PCIE for multiple times under the original architecture is simplified, so that the processing delay and the throughput of the system are greatly optimized and improved. The FPGA acceleration platform may efficiently and quickly perform OpenCL computation with greater throughput, without increasing the development workload. Moreover, the delay in the computing interaction is greatly reduced, thereby improving the real-time concurrent response capability of the system in the high concurrent application scenarios.

An apparatus for accelerated computation of data provided by an embodiment of the present disclosure is introduced below. The apparatus for accelerating the data calculation described below and the method for accelerated computation of data described above may be correspondingly referred to each other.

Figure 4:
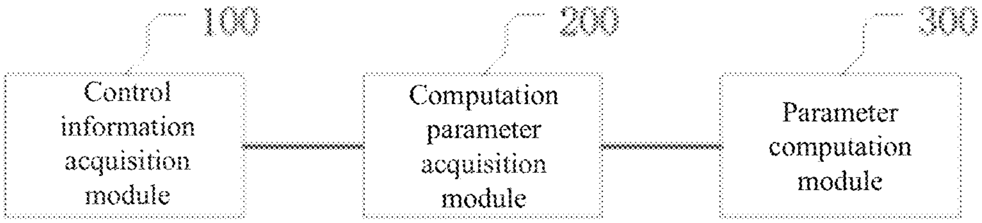
FIG. 4 is a schematic structural diagram of an apparatus for accelerated computation of data according to one or more embodiments of the present disclosure.

Referring to FIG. 4, FIG. 4 is a schematic structural diagram of an apparatus for accelerated computation of data according to an embodiment of the present disclosure.

In the present embodiment, the apparatus may include:

a control information acquisition module 100, configured to acquire computation acceleration control information from a memory of the host, and the computation acceleration control information includes input parameter address information, output parameter address information and computation configuration information;

a computation parameter acquisition module 200, configured to acquire, based on the input parameter address information, parameters to be computed from the memory of the host; and a parameter computation module 300, configured to control, based on the computation configuration information, a core computation unit to perform a computation operation on the parameters to be computed, and obtain a computation result.

In some embodiments, the control information acquisition module 100 is further configured to: acquire a context descriptor address from a memory of the accelerating device, where the context descriptor address is address data written by a computation initiator; read a context descriptor from the memory of the host based on the context descriptor address; read the input parameter address information from the memory of the host based on a parameter storage address in the context descriptor; and acquire the computation configuration information from the context descriptor.

Figure 5:
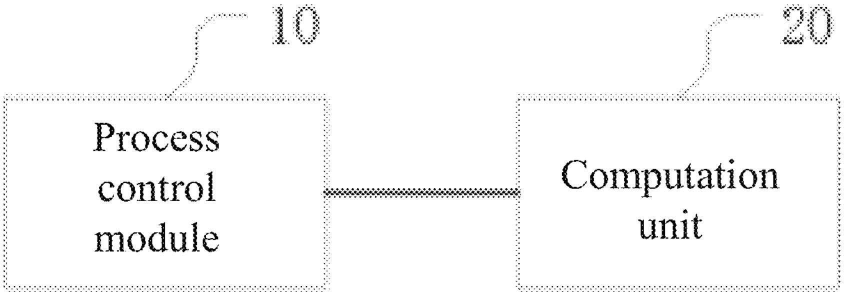
FIG. 5 is a schematic structural diagram of an accelerating device according to one or more embodiments of the present disclosure.

Referring to FIG. 5, FIG. 5 is a schematic structural diagram of an accelerating device according to an embodiment of the present disclosure.

An embodiment of the present disclosure further provides an accelerating device, including a process control module 10 and a computation unit 20.

The process control module 10 is configured to: acquire computation acceleration control information from a memory of the host, where the computation acceleration control information includes input parameter address information and computation configuration information; acquire parameters to be computed from the memory of the host based on the input parameter address information; and control, based on the computation configuration information, the computation unit to perform a computation operation on the parameters to be computed to obtain a computation result.

The computation unit 20 is configured to perform the computation operation on the parameters to be computed, and obtain the computation result.

Figure 6:
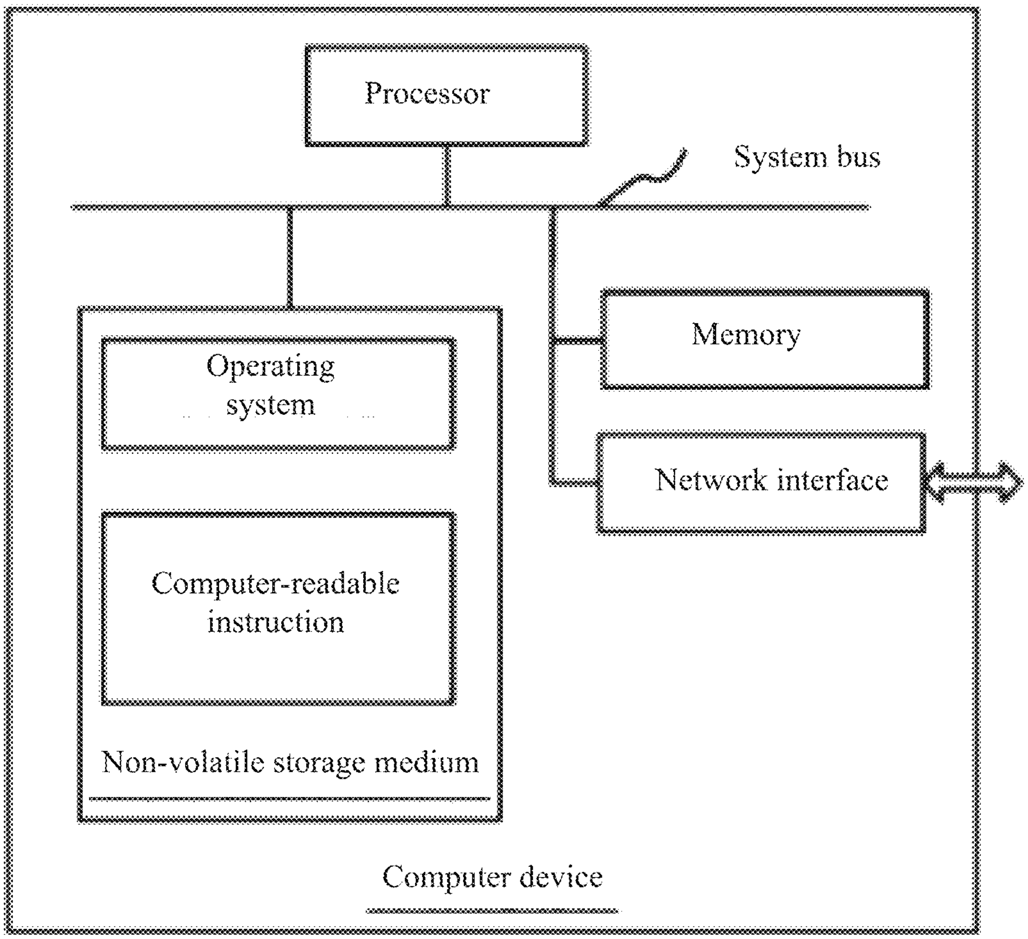
FIG. 6 is a schematic diagram illustrating an internal structure of a server according to one or more embodiments of the present disclosure.

An embodiment of the present disclosure further provides an accelerating device which may be a computer device. The computer device may be a server, the internal structural diagram of the server may be shown in FIG. 6. The computer device includes a processor, a memory and a network interface, which are connected through a system bus. The processor of the computer device is configured to provide computing and control capabilities. The memory of the computer device includes a non-volatile storage medium and an internal memory. The non-volatile storage medium stores an operating system and a computer-readable instruction. The internal memory provides an environment for the operation of the operating system and the computer-readable instruction in the non-volatile storage medium. The network interface of the computer device is configured to communicate with the external terminal through the network connection. When the computer-readable instruction is executed by the processor, the method for accelerated computation of data is realized.

An embodiment of the present disclosure further provides a server including the accelerating device stated above and a memory, and the accelerating device is connected to the memory.

A non-volatile computer-readable storage medium storing a computer-readable instruction therein, wherein when the computer-readable instruction is executed by one or more processors, the steps of any one of the embodiments of the method for accelerated computation of data stated above are realized.

Embodiments in the specification is described in a progressive way. Each embodiment focuses on the differences with other embodiments. The same and similar parts of various embodiments may be referred to each other. For the apparatus provided by the embodiment, because it corresponds to the method provided by the embodiment, the description is relatively simple. It may be referred to the description in the method section for relevant points.

It may be further realized by those skilled in the art that units and algorithm steps of examples described in combination with embodiments disclosed herein may be realized in electronic hardware, computer software or a combination of the both. In order to clearly illustrate interchangeability of hardware and software, components and steps of examples have been generally described by functions in the above description. Whether these functions are implemented in hardware or software depends on specific application and design constraints of technical solutions. Described functions may be implemented for each specific application using different methods by those skilled in the art, but such implementation should not be considered beyond the scope of the present disclosure.

A person skilled in the art may understand that all or some of the processes of the method in the above embodiments may be implemented by relative hardware according to an instruction from a computer-readable instruction, the computer-readable instruction may be stored in a non-volatile computer-readable storage medium, and the computer-readable instruction, when executed, may contain the processes of the embodiments of the method stated above. Any reference to a memory, a storage, a database or another medium used in the embodiments provided by the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external cache memory. As an illustration rather than a limitation, the RAM may be embodied in various forms, such as a static RAM (SRAM), a dynamic RAM (DRAM), a synchronous DRAM (SDRAM), a double-data-rate SDRAM (DDRSDRAM), an enhanced SDRAM (ESDRAM), a Synchlink DRAM (SLDRAM), a memory Rambus direct RAM (RDRAM), a direct-memory-rambus dynamic RAM (DRDRAM), a memory rambus dynamic RAM (RDRAM) and so on.

The technical features of the above embodiments may be combined randomly. In order to simplify the description, all of the feasible combinations of the technical features of the above embodiments are not described. However, as long as the combinations of those technical features are not contradictory, they should be considered as falling within the scope of the description.

The above embodiments merely describe some embodiments of the present disclosure, and although they are described particularly and in detail, they cannot be accordingly understood as limiting the patent scope of the present disclosure. It should be noted that a person skilled in the art may make some deformations and improvements without departing from the concept of the present disclosure, all of which fall within the protection scope of the present disclosure. Therefore, the protection scope of the present disclosure should be subject to the appended claims.

The invention claimed is:

1. A method for accelerated computation of data, comprising:

acquiring, by an accelerating device, computation acceleration control information from a memory of a host, wherein the computation acceleration control information comprises input parameter address information and computation configuration information;

acquiring, based on the input parameter address information, parameters to be computed from the memory of the host; and controlling, based on the computation configuration information, a computation unit to perform a computation operation on the parameters to be computed, and obtaining a computation result;

wherein the acquiring, by the accelerating device, computation acceleration control information from the memory of the host comprises:

acquiring, by the accelerating device, a context descriptor address from a memory of the accelerating device, wherein the context descriptor address is address data written by a computation initiator;

reading a context descriptor from the memory of the host based on the context descriptor address;

reading the input parameter address information from the memory of the host based on a parameter storage address in the context descriptor; and acquiring the computation configuration information from the context descriptor.

2. The method for accelerated computation of data according to claim 1, wherein the reading a context descriptor from the memory of the host based on the context descriptor address comprises: reading, by a direct data access mode, the context descriptor from the context descriptor address of the memory of the host; and the acquiring, based on the input parameter address information, parameters to be computed from the memory of the host comprises:

writing, by the direct data access mode and input parameter address, the parameters to be computed from the memory of the host into a memory of the accelerating device.

3. The method for accelerated computation of data according to claim 2, wherein the direct data access mode is one of direct memory access (DMA), DMA chaining and remote direct memory access (RDMA).

4. The method for accelerated computation of data according to claim 1, wherein the context descriptor comprises:

a number of the computation unit, a storage address of a running state of the computation unit and the input parameter address information.

5. The method for accelerated computation of data according to claim 4, wherein the input parameter address information comprises:

a start storage address of the parameters to be computed in the memory of the host, a start storage address where the parameters to be computed are stored in the accelerating device and parameter length information.

6. The method for accelerated computation of data according to claim 5, wherein the context descriptor further comprises output parameter address information;

after the computation result is obtained, the method further comprises:

based on the output parameter address information, writing the computation result into the memory or the accelerating device, so that the host obtains the computation result from the memory or the accelerating device.

7. The method for accelerated computation of data according to claim 6, wherein the output parameter address information comprises:

a start storage address where the computation result is stored in the memory of the host, a start storage address where the computation result is stored in the accelerating device, and a result information length.

8. The method for accelerated computation of data according to claim 4, wherein the number of the computation unit indicates the number of a core unit implementing the computation operation.

9. The method for accelerated computation of data according to claim 1, further comprising:

sending an interrupt signal to the host when the writing of the computation result completes.

10. The method for accelerated computation of data according to claim 1, wherein the computation acceleration control information is information data for managing and controlling a process of the accelerating device.

11. The method for accelerated computation of data according to claim 1, wherein the input parameter address information is used to determine an address of an input parameter in the host.

12. The method for accelerated computation of data according to claim 1, wherein the computation configuration information is information for configuring a computation process.

13. An accelerating device, comprising: a memory and one or more processors, wherein the memory stores computer-readable instructions that, when executed by the one or more processors, cause the one or more processors to implement operations of:

acquiring, by an accelerating device, computation acceleration control information from a memory of a host, wherein the computation acceleration control information comprises input parameter address information and computation configuration information;

acquiring, based on the input parameter address information, parameters to be computed from the memory of the host; and controlling, based on the computation configuration information, a computation unit to perform a computation operation on the parameters to be computed, and obtaining a computation result;

wherein the processor is further configured to implement operations of:

acquiring, by the accelerating device, a context descriptor address from a memory of the accelerating device, wherein the context descriptor address is address data written by a computation initiator;

reading a context descriptor from the memory of the host based on the context descriptor address;

reading the input parameter address information from the memory of the host based on a parameter storage address in the context descriptor; and acquiring the computation configuration information from the context descriptor.

14. The accelerating device according to claim 13, wherein the processor is further configured to implement operations of: reading, by a direct data access mode, the context descriptor from the context descriptor address of the memory of the host; and writing, by the direct data access mode and input parameter address, the parameters to be computed from the memory of the host into a memory of the accelerating device.

15. The accelerating device according to claim 14, wherein the direct data access mode is one of direct memory access (DMA), DMA chaining and remote direct memory access (RDMA).

16. The accelerating device according to claim 13, wherein the context descriptor comprises:

a number of the computation unit, a storage address of a running state of the computation unit and the input parameter address information.

17. The accelerating device according to claim 16, wherein the input parameter address information comprises:

a start storage address of the parameters to be computed in the memory of the host, a start storage address where the parameters to be computed are stored in the accelerating device and parameter length information.

18. A non-transitory computer-readable storage mediums storing computer-readable instructions, wherein the computer-readable instructions, when executed by one or more processors, cause the one or more processors to implement operations of:

acquiring, by an accelerating device, computation acceleration control information from a memory of a host, wherein the computation acceleration control information comprises input parameter address information and computation configuration information;

acquiring, based on the input parameter address information, parameters to be computed from the memory of the host; and controlling, based on the computation configuration information, a computation unit to perform a computation operation on the parameters to be computed, and obtaining a computation result, wherein the processor is further configured to implement operations of:

acquiring, by the accelerating device, a context descriptor address from a memory of the accelerating device, wherein the context descriptor address is address data written by a computation initiator;

reading a context descriptor from the memory of the host based on the context descriptor address;

reading the input parameter address information from the memory of the host based on a parameter storage address in the context descriptor; and acquiring the computation configuration information from the context descriptor.

* * * * *